US 12,515,690 B2

United States Patent
Murthy

(10) Patent No.: US 12,515,690 B2
(45) Date of Patent: Jan. 6, 2026

(54) PEDESTRIAN ALERT SYSTEM AND METHOD FOR A VEHICLE

(71) Applicant: FCA US LLC, Auburn Hills, MI (US)

(72) Inventor: Damodaran Murthy, Troy, MI (US)

(73) Assignee: FCA US LLC, Auburn Hills, MI (US)

(*) Notice: Subject to any disclaimer, the term of this patent is extended or adjusted under 35 U.S.C. 154(b) by 175 days.

(21) Appl. No.: 18/475,894

(22) Filed: Sep. 27, 2023

(65) Prior Publication Data

US 2025/0100572 A1  Mar. 27, 2025

(51) Int. Cl.
 *B60Q 1/00* (2006.01)
 *B60W 40/105* (2012.01)
 *B60W 50/14* (2020.01)

(52) U.S. Cl.
 CPC .......... *B60W 50/14* (2013.01); *B60W 40/105* (2013.01); *B60W 2050/143* (2013.01); *B60W 2050/146* (2013.01); *B60W 2520/06* (2013.01); *B60W 2554/4029* (2020.02); *B60W 2554/4041* (2020.02); *B60W 2554/80* (2020.02); *B60W 2556/50* (2020.02)

(58) Field of Classification Search
 CPC ............... B60W 50/14; B60W 40/105; B60W 2050/143; B60W 2050/146; B60W 2520/06; B60W 2554/4029; B60W 2554/4041; B60W 2554/80; B60W 2556/50
 USPC ...................... 340/425.5, 435, 436, 933, 936
 See application file for complete search history.

(56) References Cited

U.S. PATENT DOCUMENTS

| | | | |
|---|---|---|---|
| 2015/0035685 A1* | 2/2015 | Strickland | B60Q 9/008 340/901 |
| 2018/0096605 A1* | 4/2018 | Bai | B60Q 1/525 |
| 2020/0047668 A1* | 2/2020 | Ueno | G08G 1/166 |
| 2024/0071220 A1* | 2/2024 | Perumalla | B60W 60/0015 |

* cited by examiner

*Primary Examiner* — Anh V La
(74) *Attorney, Agent, or Firm* — Jeremy J. Klobucar

(57) ABSTRACT

A pedestrian alert system and method that gather vehicle route information from a host vehicle and pedestrian route information from mobile device(s) associated with one or more nearby pedestrian(s) and, in certain scenarios, alert the driver of the host vehicle to the presence of the pedestrian(s). The system may include a vehicle electronic module with a data storage unit, an electronic control unit, one or more application(s) and a communications unit, along with a navigation control module and a user interface.

20 Claims, 2 Drawing Sheets

PEDESTRIAN ALERT SYSTEM AND METHOD FOR A VEHICLE

FIELD

The present disclosure relates to a pedestrian alert system and method, more particularly, to a pedestrian alert system and method that gathers information from a host vehicle and one or more nearby pedestrian(s) and, in certain scenarios, alerts the driver of the host vehicle to the presence of the pedestrian(s).

BACKGROUND

The safety of pedestrians, joggers, cyclists, etc. is a concern, particularly in populated areas where large numbers of such people share streets and crosswalks with vehicles. Some existing vehicle systems use cameras and other sensors mounted on the vehicle to detect and evaluate pedestrians, however, such systems can be expensive and may function inadequately in certain situations. For instance, if the vehicle-mounted camera or sensor is covered with dirt or mud, or if the pedestrian is blocked or shielded from view by an intervening object, then such vehicle systems may not be able to adequately detect and evaluate the pedestrian.

SUMMARY

In at least some implementations, there is provided a pedestrian alert system for a host vehicle, comprising: a vehicle electronic module; a navigation control module connected to the vehicle electronic module; and a user interface connected to the vehicle electronic module, wherein the vehicle electronic module is configured to: gather vehicle route information from the navigation control module where the vehicle route information includes at least one piece of data selected from the group consisting of: position data, velocity data or navigation data related to the host vehicle, gather pedestrian route information from a mobile device associated with at least one nearby pedestrian where the vehicle route information includes at least one piece of data selected from the group consisting of: position data, velocity data or navigation data related to the nearby pedestrian, use both the vehicle route information and the pedestrian route information to determine a most relevant pedestrian, and initiate an alert from the user interface to a driver of the host vehicle that notifies the driver of the most relevant pedestrian.

In at least some implementations, there is provided a pedestrian alert method for a host vehicle, the method comprising the steps of: gathering vehicle route information with a vehicle electronic module, vehicle route information includes at least one piece of data selected from the group consisting of: position data, velocity data or navigation data related to the host vehicle; gathering pedestrian route information with the vehicle electronic module, pedestrian route information is gathered from a mobile device associated with at least one nearby pedestrian and includes at least one piece of data selected from the group consisting of: position data, velocity data or navigation data related to the nearby pedestrian; determining a most relevant pedestrian with the vehicle electronic module, the most relevant pedestrian is determined using both the vehicle route information and the pedestrian route information; and alerting a driver of the host vehicle with a user interface, wherein the alert notifies the driver of the most relevant pedestrian.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Referring in more detail to the drawings, there is shown a pedestrian alert system and method that gather vehicle route information from a host vehicle and pedestrian route information from one or more nearby pedestrian(s) and, in certain scenarios, alert the driver of the host vehicle to the presence of the pedestrian(s). The vehicle route information can be gathered from a navigation control module on the host vehicle, whereas the pedestrian route information may be gathered from a mobile device, such as a smart device or wearable, that is on or in the possession of each nearby pedestrian. By using both the vehicle route information and the pedestrian route information, the system and method are able to detect the presence of nearby pedestrian(s), evaluate their location and/or heading and compare it to that of the host vehicle, and, in certain scenarios (e.g., where the pedestrian(s) and the host vehicle are headed towards one another), send an alert to the driver. A potential benefit of the present system and method is that they can detect and evaluate nearby pedestrians without requiring expensive cameras and sensors mounted on the host vehicle, although the present system and method may certainly be used with such devices. Another potential benefit is that the present system and method may be able to detect and evaluate nearby pedestrians who are blocked or hidden behind some obstacle and would otherwise be obscured from a camera or sensor.

The term "pedestrian," as used herein, is not limited to a person who is walking, and may include any person who is standing, sitting, walking, jogging, running, roller skating, roller blading, in a wheelchair, riding a bicycle (mechanical or electric), riding a scooter (mechanical or electric), riding a skateboard (mechanical or electric) or riding some other type of personal transportation device. The term "pedestrian" does not include people who are passengers in the host vehicle or in other vehicles, such as nearby cars, trucks and sports utility vehicles (SUVs). Furthermore, the term "mobile device," as used herein, broadly includes any type of smart device (e.g., a smart phone, tablet, laptop, etc.), wearable device (e.g., smart watch, glasses, etc.) and/or other type of mobile electronic device.

Figure 1:
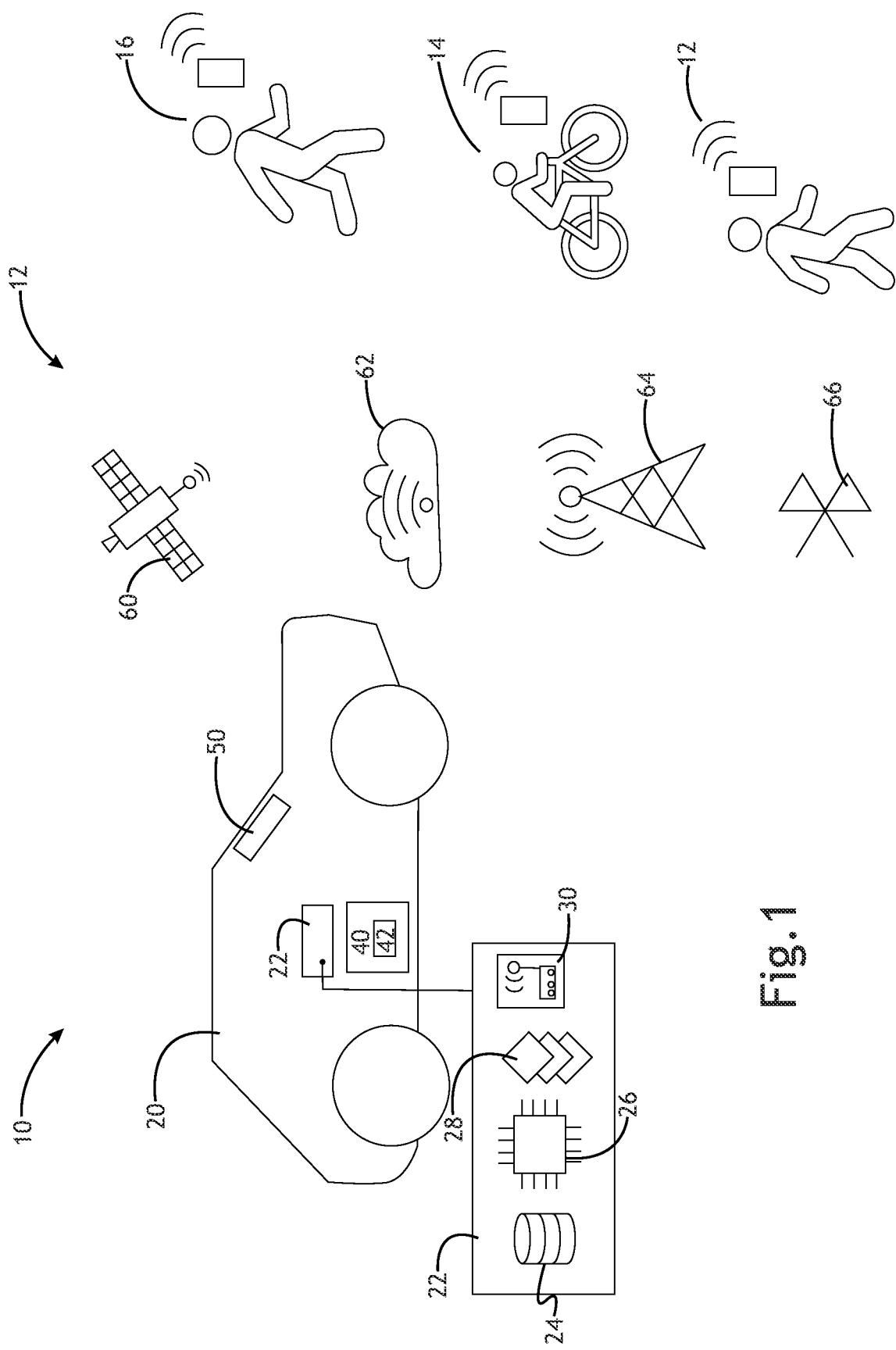
FIG. 1 is a schematic block diagram of a pedestrian alert system for a vehicle.

With reference to the schematic block diagram in FIG. 1, there is shown an example of a pedestrian alert system 10 that can detect one or more pedestrian(s) 12-16 and alert a driver of host vehicle 20 of their presence. The pedestrian alert system 10 may be installed on the host vehicle 20 and can include a vehicle electronic module (VEM) 22 with a data storage unit 24, an electronic control unit 26, one or more application(s) 28 and a communications unit 30, as well as a navigation control module 40 and a user interface 50. In order for the pedestrian alert system 10 to gather pedestrian route information from the mobile devices of pedestrians 12-16, the system is connected to a communication network of some type, such as a satellite-based network 60, a medium-range wireless communications network 62 (e.g., a local Wi-Fi network or a city wide wireless network), a cellular communications network 64 and/or a short-range wireless communications network 66 (e.g., a Bluetooth or infrared connection). In a preferred embodiment, the pedestrian alert system 10 is connected to the cellular communications network 64, as are one or more of the pedestrians' mobile devices.

Vehicle electronic module (VEM) 22 is installed on host vehicle 20 and is responsible for, among other things, gathering vehicle and pedestrian route information, evaluating such information in order to detect nearby pedestrians who may be of concern, and, under certain circumstances, initiating an alert to the driver. The vehicle electronic module 22 may include any suitable combination of software and/or hardware resources typically found in such modules, including data storage unit 24, electronic control unit 26, various application(s) 28 and communications unit 30. Vehicle electronic module 22 may be a body control module (BCM), a telematics control module (TCM), a navigation control module, an infotainment control module, or any other suitable module or device known in the art. In one embodiment, the vehicle electronic module 22 is a body control module (BCM). It is not necessary for units 24-30 to be packaged in a single integrated vehicle electronic module, as illustrated in FIG. 1. Rather, they could be distributed among multiple vehicle electronic modules, they could be stand-alone units, they could be combined or integrated with other units or devices, or they could be provided according to some other configuration. It should also be appreciated that vehicle electronic module 22 is not limited to any particular architecture, infrastructure or combination of elements, and that any suitable module or device may be employed.

Navigation control module 40 is installed on host vehicle 20, is connected to vehicle electronic module 22, and provides navigation-related functions to the host vehicle, such as determining its current position and/or heading. Navigation control module 40 may include any suitable combination of software and/or hardware resources typically found in such modules, including a global positioning system (GPS) unit 42 that uses satellite trilateration to determine vehicle position, as is well known in the art. It is also possible, however, for navigation control module 40 to include inertial navigation sensors, accelerometers and/or other types of position and/or movement sensors. Depending on the particular configuration, the GPS unit 42 may be part of the navigation control module 40 (as shown), it may be part of the vehicle electronic module 22, it may be part of a telematics unit and/or other device, or it may be a standalone unit, to cite a few possibilities. The navigation control module 40 can provide the vehicle electronic module 22 with position, velocity and/or navigation data, as will be explained.

User interface 50 is installed on host vehicle 20, is connected to vehicle electronic module 22 and navigation control module 40, and is designed to interface or interact with the driver and/or other passengers in the host vehicle. User interface 50 may include visual interfaces, such as interactive touch screens, infotainment screens, instrument displays, instrument clusters, heads-up displays, etc.; it may include audio interfaces like radios, speakers, infotainment systems, audible chimes, microphones, etc.; it may include haptic interfaces in the steering wheel, arm rest, driver's seat, etc.; or it may include other types of interfaces that are capable of conveying information or alerts to the driver. In one non-limiting example, the user interface 50 includes both a visual interface in the form of an interactive touch screen, as well as an audible interface connected through speakers of an infotainment system. The user interface 50 can receive a signal or command from vehicle electronic module 22 and generate an alert in response thereto that warns the driver of a nearby pedestrian, as will be described.

Each device 40, 42, 50 may be connected to the vehicle electronic module 22, to the individual units 24-30 of the vehicle electronic module 22 and/or to each other via a wireless or wired vehicle communications network or bus, such as a controller area network (CAN) or a local interconnect network (LIN). The same applies to the different units 24-30 of the vehicle electronic module 22.

Figure 2:
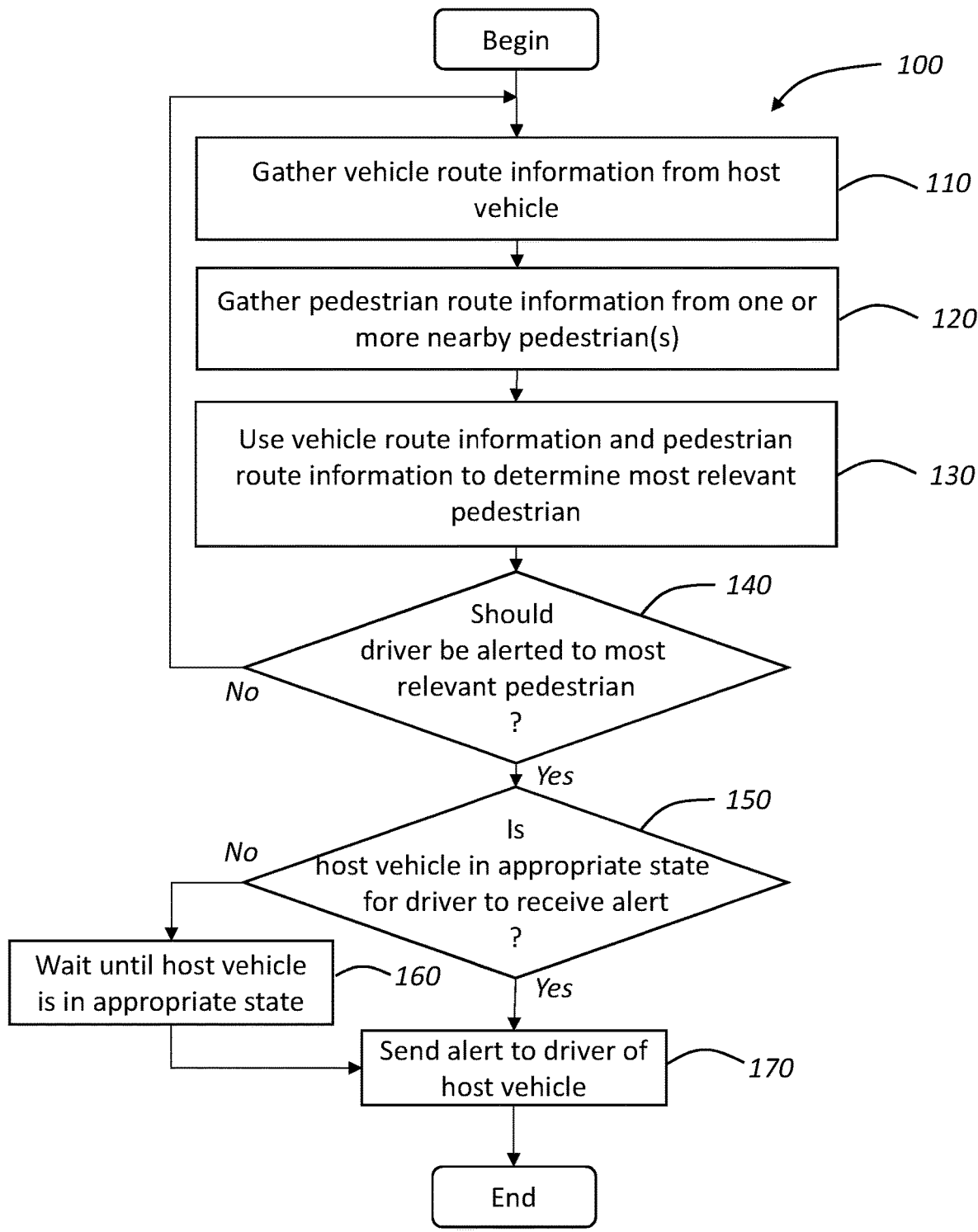
FIG. 2 is a flowchart of a pedestrian alert method that may be used with the system from FIG. 1.

Turning now to FIG. 2, there is shown an example of a pedestrian alert method 100 that may be used with system 10. The different steps of method 100 may be executed or carried out by any suitable combination of components, devices, computers, units, modules and/or systems residing in the host vehicle (e.g., devices 22-50), in the mobile devices of pedestrians 12-16, in a remote backend facility (e.g., a cloud-based backend facility managed or controlled by the vehicle manufacturer), at other locations and/or a combination thereof. In one example, some of the electronic instructions that are used to carry out method 100 are stored at and executed by the different units of the vehicle electronic module 22, other electronic instructions are stored at and executed by the mobile devices associated with pedestrians 12-16 (e.g., by certain apps that are installed on the mobile devices and are authorized to share position, velocity and/or navigation data), and yet other electronic instructions are stored at and executed by a cloud-based backend facility. The apps may be specific apps that are developed and managed by the vehicle manufacturer or they may be general apps that are commonly provided with a mobile device (e.g., general map apps). Initiation of method 100 could be triggered by an event (e.g., the host vehicle being stopped at a traffic light or stop sign), it could be triggered on a temporal basis (e.g., every 1, 10, 30, 60, 300 seconds, etc.), or it could be triggered by some other combination of factors, to cite a few possibilities.

Starting with step 110, the method gathers vehicle route information from the host vehicle. In order for the method to be able to warn the driver of nearby pedestrians, it is useful to know the current position and/or heading of the host vehicle. In one embodiment, the vehicle electronic module 22 uses some combination of units 24-30 to gather or retrieve vehicle route information from the navigation control module 40, and the vehicle route information includes position, velocity and/or navigation data relating to the host vehicle. Position data indicates the current position or location of the host vehicle (e.g., global positioning system (GPS) and/or other coordinates); velocity data indicates the current speed and direction of travel of the host vehicle (e.g., any suitable type of vector data); and navigation data indicates to where the host vehicle is traveling (e.g., a navigational route or path with a destination selected by the driver).

Step 120 gathers pedestrian route information from one or more nearby pedestrian(s) so that the method can subsequently determine which, if any, pedestrians are potentially in the path of or close to the host vehicle. The vehicle electronic module 22 may use some combination of units 24-30 to gather or retrieve pedestrian route information from the mobile devices associated with pedestrians 12-16. The pedestrian route information may include some combination of position, velocity and/or navigation data related to the nearby pedestrian(s). Consider the example where the host vehicle 20 is stopped at a traffic light and step 120 starts to gather pedestrian route information from several potential pedestrians. In order to avoid unnecessarily gathering information from pedestrians who are far away from the host vehicle and, thus, pose no legitimate concern, step 120 may only gather information from those pedestrians within a certain proximity of the host vehicle (e.g., a proximity threshold of 5, 10, 20, 50 meters, etc.). If a pedestrian is outside of this proximity threshold, then step 120 may not consider them a "nearby pedestrian" and will not gather any information from them. Step 120 may also wish to avoid unnecessarily gathering information from passengers in nearby vehicles and, in order to do so, could implement a velocity threshold that considers that person's speed and/or direction of travel. For example, if a person is detected within the proximity threshold, but is currently traveling or has recently been traveling at a speed greater than a certain threshold (e.g., a velocity threshold of 30, 35, 40 km/h, etc.), then step 120 may conclude that this person is likely a passenger in a nearby vehicle and, thus, is not a pedestrian. As mentioned above, it may be necessary for each nearby pedestrian 12-16 to have a certain app installed on their mobile device that gives authorization to share their position, velocity and/or navigation data with the present method. Other techniques may be used to determine which people are "nearby pedestrians" from whom pedestrian route information is gathered.

In step 130, the method uses both the vehicle route information and the pedestrian route information to determine the most relevant pedestrian. The term "most relevant pedestrian," as used herein, broadly refers to the pedestrian whose combination of position, velocity and/or navigation data makes them the most appropriate or suitable pedestrian to warn the driver about. As explained above, a pedestrian is not limited to someone who is simply walking, and can also include people who standing, sitting, jogging, running, roller skating, roller blading, in a wheelchair, riding a bicycle (mechanical or electric), riding a scooter (mechanical or electric), riding a skateboard (mechanical or electric) or riding some other type of personal transportation device. Step 130 may employ any number of different techniques for determining or identifying the most relevant pedestrian, including the following non-limiting examples.

Step 130 may use a tiered-factor determination technique where, as a first tier, it uses proximity of a pedestrian to the host vehicle to narrow the field of potential pedestrian candidates. Consider the example where three different pedestrians have been detected and pedestrian route information has been gathered from each of their mobile devices in step 120. If the first and second pedestrians are within 10 m of the host vehicle 20, whereas the third pedestrian is about 30 m from the host vehicle, then the method may eliminate the third pedestrian as a candidate (position or proximity is used as a first tiered factor). Next, the tiered-factor determination technique could consider velocity, which is a vector indicating both speed and direction of travel. If the first pedestrian in the example above is traveling about 25 km/h (suggesting that they are riding a bicycle or the like) in a direction heading towards the host vehicle 20, and the second pedestrian is traveling about 5 km/h (suggesting that they are walking) in a direction away from the host vehicle 20, then the method may consider the first pedestrian to be of more concern and, thus, would identify them as the most relevant pedestrian (velocity or heading is used as a second tiered factor). The tiered-factor determination technique uses different tiers based on different factors or parameters to narrow down the field of potential pedestrian candidates, where the technique sequentially considers one tier before moving on to the next. If this technique cannot decide between the first and second pedestrians in the example above, then a third tiered factor could be used based on the navigational path of the host vehicle and/or the pedestrians as a tie-breaker of sorts.

In a different example, step 130 may use a weighted-factor determination technique where different factors or parameters have different weights or importance in the determination process to choose between the field of potential pedestrian candidates. To illustrate, consider the example above where three pedestrians have been detected. If the first and second pedestrians are within 10 m of the host vehicle 20, whereas the third pedestrian is about 30 m from the host vehicle, then the method may assign a certain qualitative and/or quantitative weighting to each pedestrian based on their position or proximity to the host vehicle 20 (position or proximity of a pedestrian to the host vehicle may be the most heavily weighted factor). The closer a pedestrian is to the host vehicle 20, the more relevant they are considered. The weighted-factor determination technique may also consider velocity as another weighted factor. If the first pedestrian in the example above is traveling about 25 km/h in a direction heading towards the host vehicle 20, and the second pedestrian is traveling about 5 km/h in a direction away from the host vehicle 20, then step 130 may assign a qualitative and/or quantitative score that is reflective of this factor (velocity, including both speed and direction of travel) may be the second most heavily weighted factor). It is also possible to separate speed and direction of travel so that they are considered two separate factors, each with their own weighting. The method may further consider the navigational path of the host vehicle and/or the pedestrians as another weighted factor (for example, a pedestrian located on or near the navigational route of the host vehicle 20 would be assigned a qualitative and/or quantitative score reflecting this). The weighted-factor determination technique can then use the total or cumulative weighted score for each of the different pedestrian candidates to select the most relevant pedestrian.

It should be appreciated that the present method is not limited to the aforementioned techniques for determining or identifying the most relevant pedestrian and that any number of other techniques, factors, sequences of steps, tiers, weightings, etc. could be used in lieu of and/or in combination with those disclosed above. It is also possible for a combination of such techniques and factors to be used and for any suitable combination of units 24-30 in the vehicle electronic module 22 to carry out step 130.

Turning now to step 140, the method determines if the driver should be alerted to the most relevant pedestrian. Any reasonable combination of the aforementioned factors or parameters, as well as others, may be employed by the method to make the determination in this step. For instance, step 140 may consider the proximity of the most relevant pedestrian to the host vehicle and, if the proximity is not within a certain predetermined threshold, then the method may conclude that a warning is not warranted. Alternatively, step 140 may compare the proximity of the most relevant pedestrian and host vehicle to a dynamic threshold that is dependent on one or more other factors. For example, when the most relevant pedestrian is heading towards the host vehicle or its navigational route, then the dynamic threshold could be lower; when the most relevant pedestrian is traveling away from the host vehicle, then the dynamic threshold could be higher. In these examples, the dynamic threshold is based on a sliding scale and is impacted by other factors, such as whether a particular pedestrian is heading towards or away from the host vehicle 20. If the most relevant pedestrian does not pose a significant risk or hazard to the host vehicle 20, then step 140 may determine that an alert or warning is not justified and will send control of the method back to step 110 for further monitoring. Otherwise, the method proceeds to step 150.

In step 150, the method determines if the host vehicle is in an appropriate state for the driver to receive an alert about the most relevant pedestrian. This step may take any number of different factors or considerations into account, such as whether the host vehicle 20 is in a state where it is prudent to send the driver warnings or alerts. In one example, step 150 considers whether the host vehicle 20 is stopped (e.g., when it is at a stop light or stop sign) or is traveling less than a certain speed. In such a state, the method may determine that it is a safe and appropriate time to send the driver a warning regarding the most relevant pedestrian since the driver can consider such information before making a turn or continuing to drive on their navigational route. Factors other than vehicle speed may be considered as well, including: the type of road the host vehicle is located on (e.g., if the host vehicle is on a busy urban road, then it may be determined that there are already too many distractions), the urgency level in terms of the potential danger presented by the most relevant pedestrian (e.g., the more urgent the scenario, the more likely the method is to send an alert), the state of the vehicles surrounding the host vehicle (e.g., if there are a number of vehicles traveling at high rates of speed around the host vehicle, then the system may determine that sending the driver a warning is not ideal), etc.

If the method determines that the host vehicle is not in an appropriate state to send a warning, then the method may wait to warn the driver, step 160. If, for example, step 150 determines that the host vehicle is currently in a busy or chaotic intersection that is not ideal for driver warnings, then step 160 may wait a certain amount of time and/or until the host vehicle 20 has left that intersection. If the method decides that the host vehicle is in an appropriate state to send a warning to the driver, then the method proceeds to step 170. The determinations or decisions made in steps 140 and/or 150 are optional and may be carried out by any suitable combination of units 24-30 in the vehicle electronics module 22 or at a cloud-based backend facility, to cite several possibilities.

Step 170 sends one or more alerts or warnings to the driver of the host vehicle informing them of the most relevant pedestrian. The alert can be conveyed as a visual alert, an audible alert, a haptic alert or a combination or sequence thereof. In one non-limiting example, the vehicle electronic module 22 sends a signal or command to the user interface 50, instructing it to send an alert to the driver. In the event that the user interface 50 includes a visual and/or audible interface, step 170 may warn the driver about the most relevant pedestrian by displaying a visual alert on a display screen or on a windshield (e.g., a heads-up display), and by playing an audible alert through the host vehicle's speakers or infotainment system. As for haptic alerts, step 170 could cause the steering wheel and/or driver seat to vibrate and such a warning could be issued in conjunction with a visual and/or audible alert. The alert may include a basic warning or it may include other information, such as the relative position of the most relevant pedestrian to the host vehicle (e.g., the alert could indicate that a pedestrian was approaching from behind on the passenger side of the vehicle).

It is also possible for step 170 to send a varying series or sequence of alerts to the driver based on the imminence or proximity of the most relevant pedestrian. For instance, a level one alert could initially be used where a visual warning is displayed at a first frequency (e.g., once every 3 seconds); a level two alert could be employed where the frequency or refresh rate is increased (e.g., once every 1 second) and an additional audible warning is added (e.g., chimes) if the most relevant pedestrian gets closer to the host vehicle; and a level three alert could be carried out where, in addition to visual and audible warnings, an autonomous driving maneuver like automatic braking and/or steering is performed if the most relevant pedestrian is extremely close to the host vehicle and/or presents an imminent concern. Other alerts or warning systems could be used instead, as the present method is not limited to the preceding examples.

One potential advantage that the present system and method have over traditional systems that use onboard sensors and cameras is that they can detect and warn against pedestrians that may not be visible or detectable by sensors and cameras. For example, if a pedestrian is walking up to an intersection where the host vehicle is parked, but the pedestrian is obscured from cameras on the host vehicle by one or more trees, structures and/or other vehicles, then a traditional sensor- or camera-based system may not detect the pedestrian, as they are not in a line of sight. The present system and method, on the other hand, can potentially detect and evaluate such a pedestrian and alert the host vehicle driver about them.

The preceding description sends an alert regarding a single most relevant pedestrian, but the present system and method are not limited to this. It is also possible for the present system and method to alert the driver to multiple relevant pedestrians (e.g., the most relevant two, three, four pedestrians, etc.).

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A pedestrian alert system for a host vehicle, comprising:

a vehicle electronic module;
a navigation control module connected to the vehicle electronic module; and
a user interface connected to the vehicle electronic module, wherein the vehicle electronic module is configured to:
gather vehicle route information from the navigation control module where the vehicle route information includes at least one piece of data selected from the group consisting of: position data, velocity data or navigation data related to the host vehicle,
gather pedestrian route information from a mobile device associated with at least one nearby pedestrian where the pedestrian route information includes at least one piece of data selected from the group consisting of: position data, velocity data or navigation data related to the nearby pedestrian,
use both the vehicle route information and the pedestrian route information to determine a most relevant pedestrian,
determine that the host vehicle is in an appropriate state to receive an alert before initiating the alert from the user interface to the driver of the host vehicle, wherein the host vehicle being in an appropriate state is determined as a function of one or more of a host vehicle speed being below a threshold speed, a type of road that the host vehicle is located on, and a state of vehicles near the host vehicle, and
initiate the alert from the user interface to a driver of the host vehicle that notifies the driver of the most relevant pedestrian when it is determined that the host vehicle is in an appropriate state.

2. The pedestrian alert system of claim 1, wherein the vehicle electronic module is a body control module (BCM).

3. The pedestrian alert system of claim 1, wherein the vehicle route information includes position data in the form of global positioning system (GPS) coordinates that indicate a current position of the host vehicle and velocity data that indicate a current speed and direction of travel of the host vehicle.

4. The pedestrian alert system of claim 1, wherein the pedestrian route information includes position data in the form of global positioning system (GPS) coordinates that indicate a current position of each nearby pedestrian.

5. The pedestrian alert system of claim 1, wherein the vehicle electronic module is further configured to:
compare a proximity between the most relevant pedestrian and the host vehicle to a threshold before initiating the alert from the user interface to the driver of the host vehicle, and
initiate the alert only when the proximity is within the threshold.

6. The pedestrian alert system of claim 1, wherein
a detected pedestrian having velocity data indicating a pedestrian velocity greater than a threshold is not considered to be a potential most relevant pedestrian.

7. The pedestrian alert system of claim 6 wherein the pedestrian velocity indicates that the detected pedestrian is moving, or within a threshold time has moved, at greater than a threshold speed.

8. A pedestrian alert method for a host vehicle, the method comprising the steps of:

gathering vehicle route information with a vehicle electronic module, vehicle route information includes at least one piece of data selected from the group consisting of:
position data, velocity data or navigation data related to the host vehicle;
gathering pedestrian route information with the vehicle electronic module, pedestrian route information is gathered from a mobile device associated with at least one nearby pedestrian and includes at least one piece of data selected from the group consisting of: position data, velocity data or navigation data related to the nearby pedestrian;
determining a most relevant pedestrian with the vehicle electronic module, the most relevant pedestrian is determined using both the vehicle route information and the pedestrian route information, wherein a pedestrian having velocity data indicating a pedestrian speed greater than a threshold is not considered to be a potential most relevant pedestrian; and
alerting a driver of the host vehicle with a user interface, wherein the alert notifies the driver of the most relevant pedestrian.

9. The pedestrian alert method of claim 8, wherein the gathering vehicle route information step further comprises gathering vehicle route information from a navigation control module, the vehicle route information includes position data in the form of global positioning system (GPS) coordinates that indicate a current position of the host vehicle and velocity data that indicate a current speed and direction of travel of the host vehicle.

10. The pedestrian alert method of claim 8, wherein the gathering pedestrian route information step further comprises gathering pedestrian route information from the mobile device associated with each nearby pedestrian, the pedestrian route information includes position data in the form of global positioning system (GPS) coordinates that indicate a current position of each nearby pedestrian.

11. The pedestrian alert method of claim 8, wherein the determining step further comprises determining the most relevant pedestrian by using a tiered-factor determination technique that uses both the vehicle route information and the pedestrian route information, the tiered-factor determination technique uses at least one tier based on a proximity between the nearby pedestrian and the host vehicle to narrow a field of potential pedestrian candidates.

12. The pedestrian alert method of claim 11, wherein the tiered-factor determination technique uses another tier based on a velocity of the nearby pedestrian to narrow the field of potential pedestrian candidates, wherein the nearby pedestrian is not a candidate for being the most relevant pedestrian when the velocity data for the nearby pedestrian indicates that the nearby pedestrian is moving, or within a threshold time has moved, at greater than a threshold speed.

13. The pedestrian alert method of claim 11, wherein the tiered-factor determination technique uses another tier based on a navigational path of the host vehicle and/or the nearby pedestrian to narrow the field of potential pedestrian candidates.

14. The pedestrian alert method of claim 8, wherein the determining step further comprises determining the most relevant pedestrian by using a weighted-factor determination technique that uses both the vehicle route information and the pedestrian route information, the weighted-factor determination technique uses a proximity between the nearby pedestrian and the host vehicle as the most heavily weighted factor to choose between a plurality of potential pedestrian candidates.

15. The pedestrian alert method of claim 14, wherein the weighted-factor determination technique also uses a velocity of the nearby pedestrian to choose between the plurality of potential pedestrian candidates.

16. The pedestrian alert method of claim 14, wherein the weighted-factor determination technique also uses a navigational path of the host vehicle and/or the nearby pedestrian to choose between the plurality of potential pedestrian candidates.

17. The pedestrian alert method of claim 8, wherein the alerting step further comprises alerting the driver of the host vehicle by sending a signal or command from the vehicle electronic module to the user interface that causes the user interface to visually and/or audibly notify the driver of the most relevant pedestrian.

18. The pedestrian alert method of claim 8, further comprising the step of:

comparing a proximity between the most relevant pedestrian and the host vehicle to a threshold before performing the alerting step, and only performing the alerting step when the proximity is within the threshold.

19. The pedestrian alert method of claim 8, further comprising the step of:

determining if the host vehicle is in an appropriate state to receive the alert before performing the alerting step, and only performing the alerting step when the host vehicle is in an appropriate state.

20. The pedestrian alert method of claim 19, wherein determining if the host vehicle is in an appropriate state includes confirming that the host vehicle is stopped or is traveling less than a predetermined speed.

* * * * *